(12) United States Patent
Yerli (10) Patent No.: US 10,033,786 B2
(45) Date of Patent: Jul. 24, 2018

(54) TRIGGERING OF NOTIFICATIONS IN A COMMUNICATIONS NETWORK

(71) Applicant: Calay Venture S.à r.l., Bettembourg (LU)

(72) Inventor: Cevat Yerli, Frankfurt am Main (DE)

(73) Assignee: CineVR Europe S.à r.l., Bettembourg (LU)

( * ) Notice: Subject to any disclaimer, the term of this patent is extended or adjusted under 35 U.S.C. 154(b) by 674 days.

(21) Appl. No.: 14/532,902

(22) Filed: Nov. 4, 2014

(65) Prior Publication Data
US 2016/0127451 A1 May 5, 2016

(51) Int. Cl.
*H04L 29/06* (2006.01)
*H04L 29/08* (2006.01)

(52) U.S. Cl.
CPC .............. *H04L 65/60* (2013.01); *H04L 67/26* (2013.01)

(58) Field of Classification Search
CPC .................................. H04L 65/60; H04L 67/26
See application file for complete search history.

(56) References Cited

U.S. PATENT DOCUMENTS

| 7,434,262 | B2* | 10/2008 | Aaron ................. H04L 63/0263 |
| | | | 709/206 |
| 7,988,545 | B2* | 8/2011 | Nakano .................... A63F 13/10 |
| | | | 463/30 |
| 9,146,656 | B1* | 9/2015 | Srinivasan ............ G06F 3/0482 |
| 9,191,797 | B2* | 11/2015 | Alam ....................... H04M 3/42 |
| 9,215,709 | B2* | 12/2015 | Sugaya ............. H04W 74/0816 |
| 9,320,967 | B2* | 4/2016 | Knutsson ................ A63F 13/12 |
| 9,380,151 | B2* | 6/2016 | Yui .......................... H04M 3/02 |
| 9,602,621 | B2* | 3/2017 | Ozawa .................... H04L 47/11 |
| 9,633,574 | B2* | 4/2017 | Ruman .............. G09B 19/0076 |
| 2014/0031117 | A1* | 1/2014 | Mello ..................... G06Q 10/10 |
| | | | 463/31 |
| 2014/0342705 | A1* | 11/2014 | Harris ................. H04W 68/005 |
| | | | 455/412.2 |

\* cited by examiner

*Primary Examiner* — Uzma Alam
(74) *Attorney, Agent, or Firm* — Christensen O'Connor Johnson Kindness PLLC (57) ABSTRACT

A method of triggering a notification in a communications network method comprises specifying at least one computer device as a recipient device for the notification. The method further comprises triggering a rendering of the notification on the specified recipient device, wherein the notification has associated therewith a notification duration that is based on a current operational context of the notification. Furthermore, a network server and a computer system for triggering a notification in a communications network are defined.

20 Claims, 5 Drawing Sheets

TRIGGERING OF NOTIFICATIONS IN A COMMUNICATIONS NETWORK

FIELD

The present disclosure relates to a method, a network server, and a computer system for triggering a notification in a communications network based on a current operational context.

BACKGROUND

Communications networks generally provide the possibility of connected devices exchanging information with each other. Examples of such networks are the internet, a computer network, and a telephone network. Various communications networks may differ from each other in the respectively embodied technology and/or protocols, and they may further differ in the type of connectable devices and/or information that can be transmitted over the network.

By means of a communications network, a user of a connected device may communicate with another user of another connected device, e.g., by receiving a message the other user has actively sent. Moreover, certain activities of a user of the communications network, e.g., of a user consuming streamed data, may cause one or more automatically generated messages to be sent to the user's device, wherein the messages provide the user with appropriate information.

For instance, in a case where the user is playing a video game provided via the communications network, the user may be provided with related information when he or she has successfully achieved a certain score. As another example, in a case where the user visits a particular page in the internet (such as a page relating to a particular product offered in an online market), a notification may be automatically produced and rendered on the user's device, wherein the notification may include information about a related page (or, in the mentioned example, about a related product). Moreover, when a social networking service is provided via the communications network, a user logging into the platform may automatically be notified, for example, about other users currently online and belonging to a previously registered community. Such notifications may include a possibility to rate certain data that other users have provided to the platform. Thereby, for instance, a first user may be provided with the possibility to press a thumbs-up or a thumbs-down button so as to express his or her appreciation or depreciation, respectively, with regard to data another user has provided to the platform.

However, such known technologies have limited flexibility, as the notifications are generally generated in a predetermined, static manner not taking into account current conditions and circumstances.

There is, therefore, a need for a technique allowing for a more flexible rendering of notifications.

SUMMARY AND INITIAL DESCRIPTION

According to a first aspect of the present disclosure, a method of triggering a notification in a communications network is provided. The method comprises specifying at least one computer device as a recipient device for the notification. The method further comprises triggering a rendering of the notification on the specified recipient device, wherein the notification has associated therewith a notification duration that is based on a current operational context of the notification.

As used herein, the term "computer device" is to be understood as referring to an apparatus that is capable of being connected to the communications network and to render the notification. Therefore, a device may be a personal computer, a notebook, a tablet, or a console, just to specify some examples. The connection to the communications network may be wired or wireless and the communication within the communications network may implement one or various transmission technologies and/or protocols.

The term "operational context of the notification" may refer to any information that may influence the generation, transmission, and/or rendering of the notification. For instance, the context may by defined by a set of one or more parameters affecting a transmission speed in the communications network. Such parameters may be a number of devices connected to the communications network, and/or a type, performance, and/or location of such device, for example. Additionally or alternatively, the set of parameters may include parameters relating to data (such as a content or size of data) that is to be processed or that has been processed within a predetermined time interval.

Methods according to the present disclosure can be implemented on a dedicated processing device or a computer device, such as on a network server or any other dedicated network component.

According to a second aspect of the present disclosure, a network server for triggering a notification in a communications network is provided. The network server is configured to specify at least one device as a recipient device for the notification, and to trigger a rendering of the notification on the specified recipient device. A notification duration is associated with the notification, wherein the notification duration is based on a current operational context of the notification.

In at least one preferred embodiment, the duration of operability may be determined based on one or more of a number of devices connected to the communications network; a general computing capacity of the specified recipient device; a current performance of the specified recipient device; a geographic position of the specified recipient device; a general computing capacity of the network server; a current performance of the network server; a general computing capacity of a further server connected to the communications network; a current performance of the further server; a transmission capacity of the communications network; a current workload of the communications network; a time when notification data at least partially defining the notification is produced; a time when activity data is captured; and at least a portion of the activity data.

According to yet another aspect, a computer system is provided, comprising a network server for triggering a notification in a communications network, including a processing configured to specify at least one computer device as a recipient device for the notification, and to trigger a rendering of the notification on the specified recipient device, wherein a notification duration is assigned to the notification, and the notification duration is based on a current operational context of the notification. The specified recipient device is configured to receive notification data defining the notification, to render the notification based on the notification data, and based on notification duration data included in the notification data or separately received, to stop rendering the notification, and/or to modify a notification content and/or make a user interface included in the notification unreceptive.

Accordingly, the present disclosure provides for initiating a notification having a dynamically determined notification duration associated therewith be rendered on a specified recipient device. Accordingly, the duration can be dynamically adapted to the operational environment so as to ensure that imponderabilities—relating to the conditions under which the notification is to be rendered can be automatically considered, thus ensuring that respectively appropriate notification duration is assigned to the notification.

The notification duration may determine a period of time after which the rendering of the notification is terminated. Accordingly, for instance, the notification or a portion thereof may be displayed for the notification duration and erased thereafter.

Additionally or alternatively, the notification may include at least one temporarily active element that may disappear or become inactive or change its function when the notification duration elapses. For example, such an element may be a user interface included in the notification, which may be temporarily active such as receptive for user input during the notification duration, or during a time of receptivity being functionally dependent on the notification duration (with respect to a predetermined function). For instance, the time of receptivity may be a predetermined portion (such as half) of the notification duration, or a predetermined time interval (such as 15 seconds) less than the notification duration. As is to be understood, the period of receptivity may be based on many other functions.

When the period of receptivity has elapsed, the user interface may be erased and/or become completely unreceptive, or it may change its function (e.g., such that any operation thereof causes an error message to be rendered).

This may allow for giving a user an appropriate time interval to provide response data by operating the user interface, and/or for ensuring that such response data is quickly transmitted via the communications network.

During said period of receptivity, the user's response may be given preference as compared to other data possibly transmitted over the communications network, and/or a communication path within the communications network may be reserved for a response provided by user input into the user interface.

As a result, the response is not delayed or dropped due to network congestion so a reliable real-time transmission thereof can be ensured. Moreover, the limited time available may encourage a user to quickly respond to the notification, thus stimulating communication over the communications network.

The method may comprise determining the notification duration (e.g., based on certain criteria as detailed below). Alternatively or additionally, the method may comprise at least partially delegating such determination to one or more remote entities (e.g., devices or software application servers) connected to the communications network. Analogously, the network server may be configured to determine the notification duration alone or in combination with other entities connected to the communications network, and/or to at least partially delegate the determination to such other entities. Such delegating may include sending briefing data via the communications network, the briefing data telling its recipient to determine the notification duration. The briefing data may be included in the above-mentioned instruction data.

The triggering to render the notification on the specified recipient device may comprise producing notification data at least partially defining the notification, and sending the notification data to at least one computer device specified as the recipient device for the notification (further referred to herein as the specified recipient device).

Additionally or alternatively, the triggering may comprise producing notification data at least partially defining the notification, and sending both the notification data and instruction data via the communications network, the instruction data telling its recipient to send the notification data to the specified recipient device. Accordingly, the notification data and the instruction data may be sent separately or combined in a single message.

As a further additional or alternative possibility, the triggering may comprise producing provisional notification data at least partially defining the notification, and sending both the provisional notification data and instruction data via the communications network, the instruction data telling its recipient to produce notification data based on the provisional notification data, the notification data defining the notification, and to send the notification data to the specified recipient device. As above, the notification data and the instruction data may be sent separately or combined in a single message.

Moreover, the triggering may (additionally or alternatively to the above possibilities) comprise sending instruction data via the communications network, the instruction data telling its recipient to produce notification data at least partially defining the notification, and to send the notification data to the specified recipient device.

Additionally or alternatively, the instruction data may include data telling its recipient to embed expiration data into the notification data, the expiration data causing at least a portion of the notification to be erased or modified when the notification duration elapses. In the case where the notification includes a temporarily receptive user interface, the expiration data may cause the user interface to become inactive (which may mean that the user interface becomes inoperable and/or disappears and/or changes its function) when the notification duration or a duration of receptivity determined based on the notification duration elapses. Possibly, the instruction data may include data specifying the notification duration.

Additionally or alternatively, the triggering to render the notification on the specified recipient device may comprise sending expiration data to the specified recipient device when the notification duration elapses (or in advance, when the notification duration is about to elapse within a predetermined time interval in the future), and/or causing that such expiration data be sent by another device when said duration elapses (or will elapse within a predetermined time interval in the future).

As is apparent from these alternative embodiments, the triggering may provide causing that notification data to be generated and sent to the specified recipient device. Therein, the generation of the (precise) notification data may be assigned to one or various entities, one of which may be the above-mentioned network server.

Preferably, the notification is rendered based on notification data sent to the specified recipient device which is preferably connected to the communications network. The specified recipient device is preferably adapted to receive the notification data, to render (e.g., to display) the notification based on the notification data and, based on expiration data embedded in the notification data and/or received separately via the communications network, to modify at least a portion of the notification (e.g., to make a portion disappear from a display) when the notification duration elapses.

The period of the notification duration may start when the notification is sent to the specified recipient device, or when the rendering of the notification is started, e.g., when the notification pops up in a display of the specified recipient device, or a predetermined time (such as, for example, 1 sec, 5 sec, or 15 sec) after the sending of the notification or after the starting of its rendering.

When the notification duration has elapsed, the notification or a portion thereof may be caused to change or disappear and/or an indication of further inoperability of a temporarily active element (such as a user interface) included in the notification may preferably be rendered to the user, such as visually within a same window showing the notification. Additionally or alternatively, an acoustic alarm signal may be produced indicating that the notification duration has elapsed.

Preferably, the period and/or the respectively remaining time thereof are/is indicated to the user within the notification. The user of the specified recipient device may thus be informed about a time interval available for inputting response data. Thereby, the user may be enabled and encouraged to operate a possibly included user interface (such as to provide response data) within the specified period.

When connected to the communications network, the above-mentioned network server may provide server functionality. For instance, the network server may be configured to act as a server in a centralized server-client network configuration. The network server may serve to run the network or a portion thereof. In particular, the network server may run a social networking platform to which the specified recipient device may be connected.

The network server may be a hardware server device comprising at least one computer device. Preferably, the network server hosts at least one application program configured to provide social networking services.

According to a further embodiment, the network server may be a functional module (which may be defined by a software package including one or more modules) providing the mentioned functionalities when the network server is run on one or more computer devices hosting the network server.

When the notification includes a user interface that is temporarily receptive during a period of receptivity (which period may functionally depend on the notification duration), the specified recipient device is preferably configured to receive user input data during the period of receptivity of the user interface, and to send response data to the network server based on received user input data.

According to a preferred embodiment, the step of specifying a recipient device for the notification comprises acquiring activity data indicative of at least one user activity in the communications network and determining that the activity data is in accordance with at least one predetermined condition.

Therefore, the recipient device may be specified based on the activity data. Accordingly, a dynamic, context-based selection of the recipient device of the notification may be achieved, as the recipient device may be selected based on a relation between a user and/or his or her activity in the communications network and a predetermined condition.

The step of determining that the activity data is in accordance with at least one predetermined condition may comprise comparing at least a portion of the activity data with one or more records of a table stored in a computer memory, e.g., within a database, wherein the at least one predetermined condition may be reflected in at least one of said records.

The activity data may comprise data indicative of a user acting on a computer device. For example, the activity data may include data indicative of the user logging into a social networking service.

The step of determining that the activity data is in accordance with at least one predetermined condition may include determining that the user has one or more predetermined properties, such as that he or she is registered in a particular community within a social network device. As a consequence, this user's computer may then be specified as the recipient device.

Additionally or alternatively, the activity data may comprise data indicative of a (further) user acting on a computer device different from the specified recipient device. For instance, the activity data may include game data relating to some achievement of a user playing a video game.

The activity data may comprise first and second activity data that is respectively input by a first user and a second user into a first computer device and a second computer device. The first computer device may be specified as the recipient device. As a consequence, the notification may be sent to the first user. Such notification may include information relating to the second user. For example, a user interface included in the notification may be receptive, during a duration of receptivity (which may be equal to the notification duration or be determined based on the notification duration assigned to the notification), to receive from the first user a rating of the second user and/or of his or her activity as indicated by the second activity data.

As a particular example, the activity data may identify the first and the second user, and the determining that the activity data is in accordance with a predetermined condition may include determining that a particular relation between the first and second user has been registered, such as a relation indicating that the first and the second user have identified each other (e.g., as friends) in a social networking service.

According to an embodiment of the present disclosure, the activity data (which in the above case may be the second activity data) may relate to information the user (which in the above case may be the second user) provides (such as data the user wishes to share over a social networking service). Additionally or alternatively, said activity data may relate to information the user consumes via the user's device and/or via the communications network (such as game data or a video clip), and/or to an achievement he or she has accomplished, such as a current game score.

Information the user consumes via the user's device may be streamed data that may relate to a real or virtual event that is broadcast over the communications network, such as a video game, a chat room, a rendered stock market, or a virtual stage, for instance. The streamed data may comprise visual streamed data and/or audio streamed data. In such case, determining that the activity data is in accordance with at least one predetermined condition may comprise determining that the activity data is indicative of a predetermined success level with respect to the streamed data. As used herein, the term "success level" is to be understood as comprising the case of a "loss level" as indeed, a loss is considered to be a negative success.

For instance, when the streamed data relates to a video game the user is playing, the activity data may comprise game input data. In such case, determining that the activity data is in accordance with at least one predetermined condition may comprise determining that the game input data is indicative of a predetermined success level with respect to the video game.

As another example, when the streamed data includes live broadcast data of a current event preferably allowing user participation, such as an online competition, the activity data may comprise user data input as a contribution to the competition. Determining that the activity data is in accordance with at least one predetermined condition may then comprise determining that the contribution is rated (by some virtual or real jury or audience) with a predetermined grade.

When the streamed data includes live broadcast data of a real or virtual stock market taking place at a remote location, the activity data may comprise data reflecting one or more of the user's transactions in the stock exchange. The determining that the activity data is in accordance with at least one predetermined condition may then comprise determining that the user has accomplished a predetermined profit or loss, which may relate to one or more predetermined shares or funds.

Preferably, the notification includes a notification content, at least a portion of which may be dynamically specified based on a current context, such as based on user activity or at least one current condition of the operation environment. The notification content may comprise an indication of the notification duration.

According to a preferred embodiment, the notification content includes information relating to captured activity data. In particular, the notification content may comprise information indicative of user activity on another than the specified recipient device. Accordingly, such information may be included in the notification and thus be rendered.

For example, as mentioned above, the activity data may include first activity data indicative of a first user's activity on a first computer device, and second activity data indicative of a second user's activity on a second computer device, wherein the first computer device may be specified as the recipient for the notification. In such case, the notification content may include information on the second activity data.

In particular, the notification content may include data indicative of the second user consuming streamed content, such as a video clip or game data, and/or the user's achievements in such game. As a consequence, the first user may be informed about activities of the second user, and the first user may provide response data based on the information, e.g., by way of the user interface included in the notification.

At least a portion of the notification content may be displayed within the user interface. For example, the notification content may include possible response data among which a user of the specified recipient device may select by activating an included user interface accordingly. For example, the notification content may indicate that the response data may be selected among data signaling appreciation and data signaling depreciation, or among data respectively relating to a set of ratings. These options may be selectable by clicking on respective buttons displayed in the user interface, and/or by inputting the data into one or more response field(s) within the user interface.

As mentioned above, the notification duration may be determined based on one or more parameters, such as one or more of: a number of devices connected to the communications network; a general computing capacity of the specified recipient device; a current performance of the specified recipient device; a geographic position of the specified recipient device; a general computing capacity of at least one server controlling the communications network and/or providing services (such as streamed data) via the communications network; a current performance of at least one server controlling the communications network and/or providing services via the communications network; a transmission capacity of the communications network; a current workload of the communications network; a time (e.g., a time of day) when the notification data is produced; a time (e.g., a time of day) when the activity data is captured; and/or at least a portion of the activity data. Therein, the mentioned server may be the above-mentioned network server, and/or an application server or a (centralized) server-host in a client-server network.

Preferably, an outcome of a predetermined function having one or more of the above parameters as variable(s) is automatically calculated based on the respective current values for the variables, and the notification duration is determined based on the outcome. The function may be given in terms of a table of values.

Thus, the determining of the notification duration may comprise selecting the duration, based on one or more parameters (such as the above-mentioned parameters), among a set of two, three, or more different predetermined possible duration values that may be previously stored in a memory. Such embodiment may simplify and/or accelerate the determination.

Accordingly, at a first point in time when the relevant parameter(s) take one or more first value(s), the notification duration may be set to a first notification duration, whereas at a second point in time, when the relevant parameter(s) take one or more second value(s) at least one of which is different from its corresponding first value, the notification duration may be set to a second notification duration, the second duration being different from the first duration.

For instance, in a case where the activity data comprises game input data, the duration data may be determined based on a game level the user has reached so far. Accordingly, at a first level of the game, the notification duration may be set to be a first notification duration, whereas at a second level of the game, the notification duration may be set to be a second notification duration that is different from the first notification duration.

As another example, additionally or alternatively, a first performance of the specified recipient device and/or of the communications network may be compensated, as compared to a second performance, by respectively modifying the notification duration.

Preferably, one, some, or all of the parameters used for determining the notification duration may be tracked and/or measured, and/or data indicative of one, some or all of these parameters may be transmitted, via the communications network, to one or more devices determining the notification duration (which may be the network server, for example).

Accordingly, the respective values can be automatically captured, received, and/or measured. This may provide for an appropriate dynamic determination based on current conditions. For example, when a parameter such as a current workload of the communications network changes over time, this may be automatically detected, and the notification duration of the user interface may be determined taking the change into account.

A method according to a preferred embodiment comprises receiving response data indicative of data which has been input, responsive to the rendering of the notification, into the specified recipient device.

The method may further comprise triggering, based on the response data (input by a user of the specified recipient device), rendering of a further notification on at least one computer device connected to the communications network.

Therein, triggering may include producing further notification data and/or communicating with a connected device so as to cause the connected device to produce such data.

Analogously, the network server (according to the above-mentioned second aspect of the present disclosure) may be configured to receive such response data and possibly to trigger, based on such received response data, rendering of a further notification on at least one computer device.

The notification may thus be a first notification, and the further notification data may be a second notification. The further notification data may cause a flag or mark to be set at an addressee of the further notification, such as a flag or mark indicating that the user operating the user interface (thus, the recipient of the first notification) disregards/depreciates or appreciates/approves/supports some activity of the addressee of the further notification.

For instance, as mentioned above, the activity data may comprise first and second activity data respectively input by a first user of a first computing device and a second user of second computing device, wherein the first computer device is the specified recipient for the first notification. The received response data may thus have been input into the first computer device. Said further notification may then be displayed on the second computer device.

Preferably, the further notification renders information indicative of the received response data. The response data may comprise data indicative of how the first user of the specified recipient device rates the activity of the second user. Accordingly, by means of the further notification, the second user can receive feedback, such as appreciation or refusal.

Alternatively or additionally, the first notification may include a suggestion for the first user to share data with the second user. The response data may then include further data indicative of the user accepting the suggestion and/or the data to be shared and/or data facilitating access to the data to be shared (e.g., a direction in the communication network, possibly accompanied with protection key data).

Alternatively or additionally, the (first) notification may include an offer for a proposed arrangement such as a deal. Such proposed arrangement may be computed (e.g., by a further connected arrangements server) based on the user activity data. The response data may then be indicative of whether or not the user of the specified recipient device accepts the proposed arrangement.

In such case, the method may further comprise communicating, based on the response data, with the arrangements server. If the response data indicates acceptance of the proposed arrangement by the user, the arrangements server may register the acceptance.

According to an embodiment of the present disclosure, instructions for executing the method may be stored on one or more computer-readable media.

The network server may be included in a system further comprising the specified recipient device and/or a notification server (which preferably is/are connected to the communications network). The notification server may be a hardware server including at least one computer device, or it may be a functional module providing the mentioned functionality when run on one or more computer devices.

Preferably, the notification server is configured to receive and/or produce notification data at least partially defining the notification, to receive instruction data telling the notification server to send the notification data to the specified recipient, and to indeed send the notification data to the specified recipient device.

Accordingly, the notification server may be configured to carry out the sending of the notification data to the specified recipient. Therein, the notification server may be further configured to receive preliminary notification data and to produce the notification data based on the preliminary notification data.

The notification data may include expiration data causing the user interface to become inoperable when the notification duration elapses. Alternatively, the network server and/or the notification server may be configured to send expiration data to the specified recipient device (e.g., separately from the notification data) when the notification duration elapses, and/or to cause such expiration data to be sent by another device.

The notification server may be further configured to determine the notification duration, based on one or more current parameters as mentioned above, and/or based on the instruction data and/or on received (possibly preliminary) notification data. The instruction data may originate from the network server or from another device connected to the communications network.

According to an embodiment of the present disclosure, the system comprises a stream server (preferably connected to the communications network) that may be a hardware server including at least one computer device, or a functional module providing its functionality when run on one or more computer devices.

The stream server may be configured to provide streamed data (such as streamed data mentioned above) that may be receptive and/or responsive to user interaction (such as a streamed data relating to a video game or to an online competition) via the communications network. The stream server may further be configured to provide activity data indicative of at least one user activity (e.g., user interaction) to the network server.

The step of providing the activity data may comprise determining that the streamed data and/or some user interaction data is in accordance with one or more predefined criteria.

For instance, the streamed data provided by the stream server may be influenced by a user inputting interaction data into a client device receiving the streamed data. When the combined user interaction data and the streamed data reflect compliance with a predetermined criterion (or compliance with one or more of a set of predetermined criteria), the stream server may determine that the activity data, which may relate to the predetermined condition, is provided to the network server.

As a particular example, the streamed data may render a video game, and the predetermined criterion may relate to a user having reached a predetermined game success level, such as a particular score. Thereby, the stream server may inform the network server about a current situation, and the network server may trigger accordingly an appropriate notification.

According to an embodiment of the present disclosure, the system includes an arrangements server (preferably connected to the communications network) being configured to receive trigger data telling the arrangements server to produce arrangement data relating to the user of the specified recipient device. The arrangements server may further be configured to accordingly produce the arrangement data and to transmit the arrangement data and the instruction data to the notification server. The trigger data and/or the arrangement data may be generated based on the activity data indicative of user activity. The arrangement data may relate to an arrangement intended to be proposed to the user of the recipient device. The notification server may further be configured to produce the notification data based on the arrangement data.

The arrangements server may be a hardware server including at least one computer device, or it may be a functional module providing the mentioned functionality when run on one or more computer devices. The trigger data may originate from the network server or from another device connected to the communications network.

The proposed arrangement may be accepted or denied by the user. To this end, the notification may include a user interface configured to receive user input indicating whether the user accepts the proposed arrangement. For instance, such user interface may include an accept-button the user may click on to accept the proposed arrangement.

Preferably, the user interface is receptive only during a period of receptivity. Accordingly, the user can accept the proposed arrangement only during a limited period of time.

The network server may be configured to receive acceptance data being input responsive to the rendering of the notification on the specified recipient device, wherein the acceptance data may indicate that a user of the specified recipient device accepts the proposed arrangement. When the above-mentioned stream server is further included in the system, the network server may further be configured to send, based on the received acceptance data, an acceptance message to the stream server. The stream server may be configured to modify, based on the acceptance data, the streamed data it is providing.

For instance, when the streamed data provides a video game and a player has reached a particular level (which may be reflected in the activity data provided by the stream server, as mentioned above), the arrangements data may relate to an offer of a particular game asset (such as a particular weapon, a particular protection device, a specific capability and/or some other game features provided to a virtual person or team appearing in the game and activated or controlled by the player of the game). Thus, when the user accepts the arrangement, the stream server may modify the streamed data (thus, the game) so as to incorporate the particular game asset.

Each of the network server and—when included—the notification server and/or the arrangements server may be configured to determine the notification duration, alone or in combination with one or both of the others.

The described task sharing and the pathway of the transmitted data between the different entities may provide an advantage of providing a secure transaction layer.

According to a further aspect, a computer-readable medium is provided, such as a non-transitory computer-readable storage medium, said computer-readable medium having instructions stored thereon, wherein said instructions, when executed by a computing device, cause said computing device to automatically perform a method according to embodiments of the present disclosure. In particular, the computing device may automatically perform a method of triggering a notification in a communications network, the method comprising specifying at least one computer device as a recipient device for the notification; and triggering that the notification be rendered on the specified recipient device, wherein a notification duration is assigned to the notification, the notification duration being based on a current operational context of the notification.

As is to be understood, some or several of the features described herein may be combined with each other.

DESCRIPTION OF THE DRAWINGS

Further features and advantages of the present disclosure, as well as the structure and operation of various illustrative embodiments are described in more detail below with reference to the accompanying schematic drawings, wherein.

DETAILED DESCRIPTION

In the following description, reference is made to the drawings which show, by way of illustration, various embodiments of the present disclosure. Also, various embodiments will be described below by referring to several examples. It is to be understood that the embodiments may include changes in design and structure without departing from the scope of the claimed subject matter.

Figure 1:
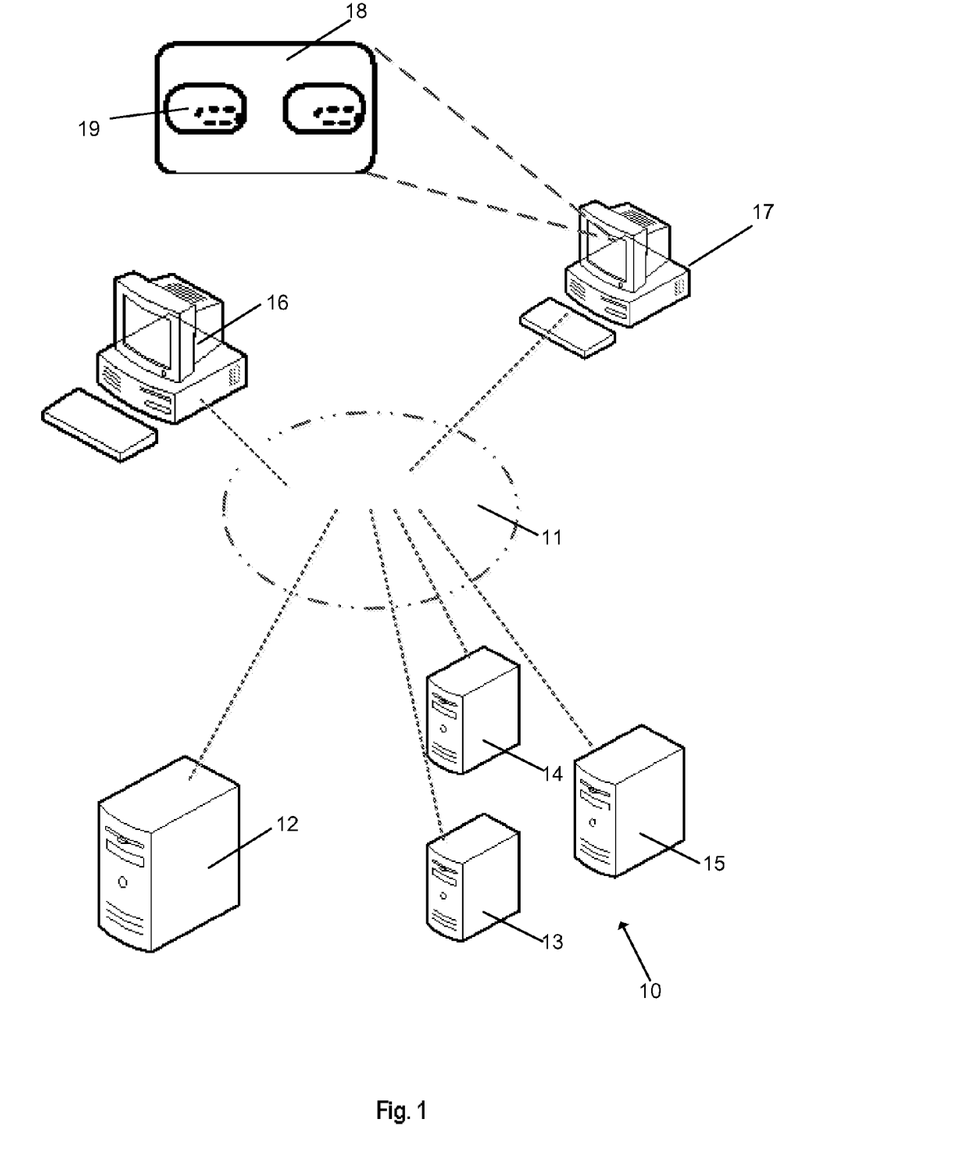
FIG. 1 schematically depicts a system configured in accordance with the present disclosure.

As shown in FIG. 1, network server 12 (which may provide general network services and/or which may be a platform server servicing a social networking platform) is included in a system 10 further comprising a notifications server 13, a stream server 14 (such as a game server providing an interactive video game, for instance), and an arrangements server 15. These servers are connected to a communication network 11. Further connected to the communications network are client devices 16 and 17, which are configured to receive input of a user A and a user B, respectively.

The network server 12 may be configured to acquire activity data indicative of the users of the devices 16 and/or 17. For instance, the activity data may be indicative of user A of device 16 requesting streamed data from the stream server or providing interaction data (such as when playing a video game, when listening to a music track, and/or when watching a video clip, for instance). Additionally or alternatively, the activity data may indicative of user B, of device 17 logging into a social networking service, for example.

The network server 12 may evaluate the activity data with regard to one or more predetermined conditions. As a consequence, it may, for example, determine that users A and B have registered each other as friends within the social networking service, and/or that user A has reached a particular success level with regard to the streamed data that user A is consuming. As a result, the network server may specify device 17 of user B as a recipient device for a notification 18 having assigned thereto a notification duration and including a user interface 19, the user interface having a particular duration of receptivity which may depend on the notification duration; in the above denomination, user B may thus be the "first" user and computer device 17 may be the "first computer device."

Said notification duration is dynamically determined based on a current operational context of the communications network. For instance, the duration may be determined based on one or more of the number of devices connected to the communications network; a general computing capacity of the specified recipient device 17; a current performance of the specified recipient device 17; a geographic position of the specified recipient device 17; a general computing capacity of each or any of the servers 12, 13, 14, and 15; a current performance of said servers; a transmission capacity of the communications network 11; a current workload of the communications network 11; a time (e.g., a time of day) when notification data defining the notification is produced; a time (e.g., a time of day) when the activity data is captured; and/or at least a portion of the activity data.

The network server 12 may be configured to determine accordingly the notification duration. Additionally or alternatively, the network server may be configured to request the notification duration or contribution to the determination thereof from servers 13, 14, and/or 15. Accordingly, the notification duration may be determined by each of said servers, alone or in cooperation with one, two, or all of the other of said servers.

The network server 12 is further configured to trigger that the notification 18 is rendered on the specified recipient device 17. In the depicted case, the notification is accordingly displayed on a display of said device 17.

The triggering may include sending instruction data, via the communications network 11, such as to the notifications server 13, the instruction data telling the notifications server 13 to produce notification data at least partially defining the notification 18, and to send the notification data to the specified recipient device 17.

Figure 2A:
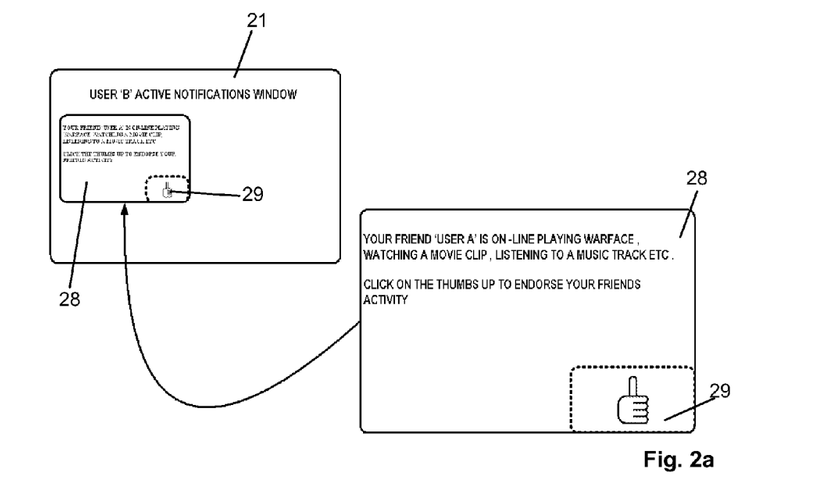
FIG. 2a depicts an exemplary first notification rendered to a first user.

As a consequence, the specified recipient device 17 receives the notification data and accordingly renders the notification, such as in a notifications window 21 as shown in FIG. 2a.

Such notification may include a notification content informing user B of the specified recipient device 17 about the current activity of user A, and inviting user B to rate the activity of A. To do so, B may provide response data by operating the user interface 19. The notification 18 may be as the exemplary notification 28 depicted in FIG. 2a, wherein B is suggested to press a thumbs-up button 29 to endorse A's activity. As is to be understood, other alternative notification contents and user interfaces allowing an alternative user input are possible.

Figure 2B:
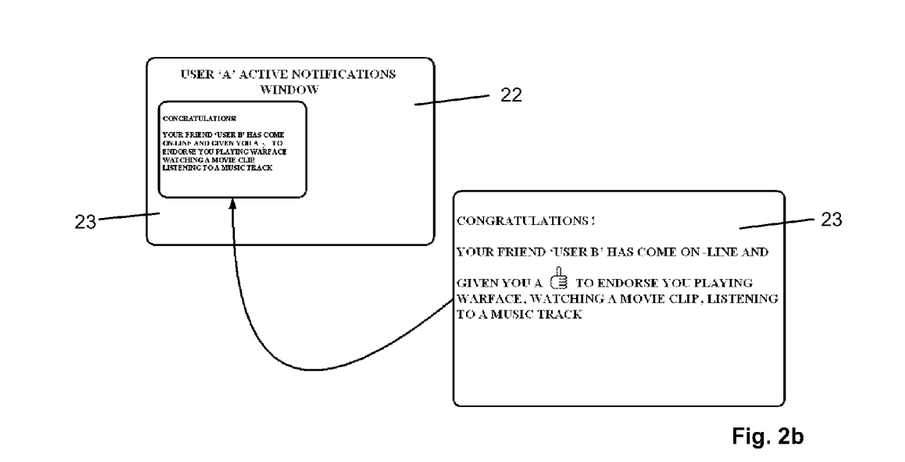
FIG. 2b depicts an exemplary second notification rendered to a second user.

The network server 12 may be configured to trigger, based on the response data, rendering of a further notification. For example, if in the above exemplary case user B has pressed the thumbs-up button, a notification 23 as depicted in FIG. 2b may be rendered within a respective window 22 on device 16 of user A.

Figure 3:
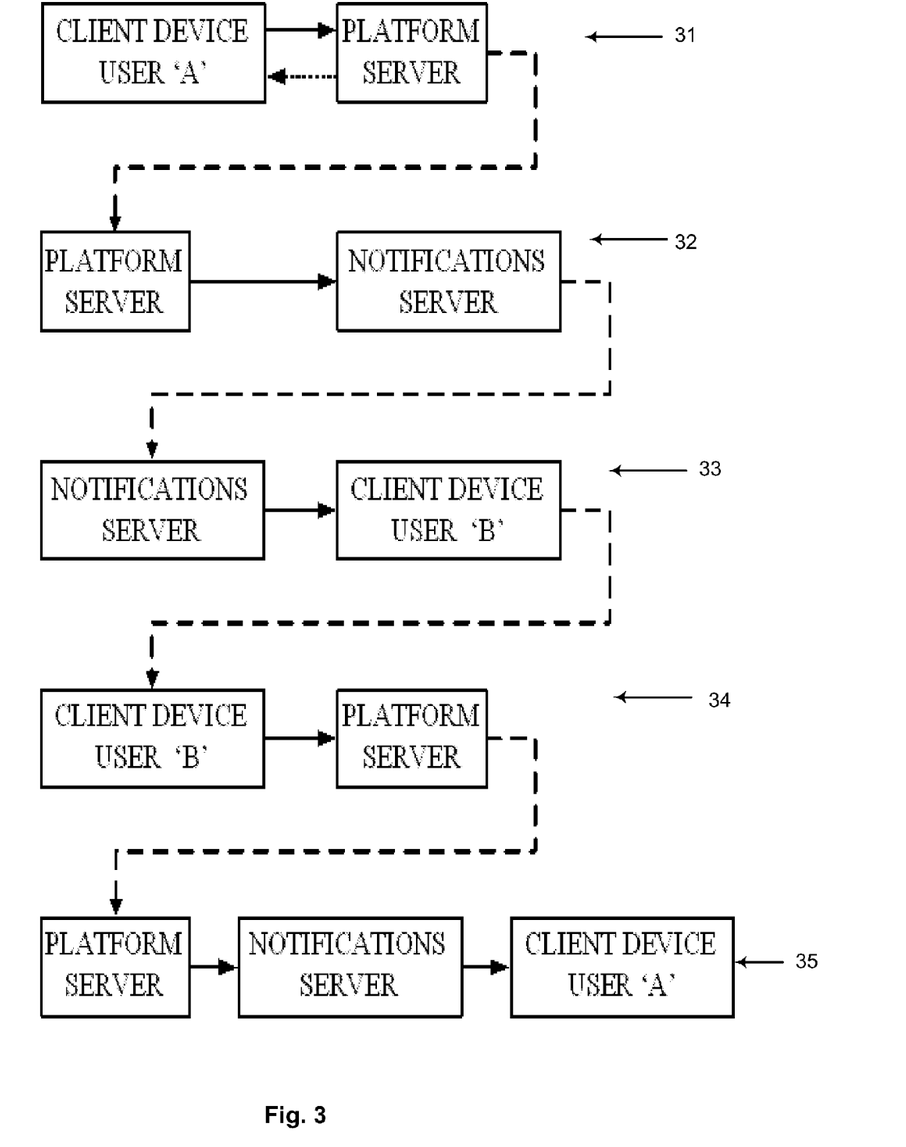
FIG. 3 exemplarily shows a first method embodying the present disclosure.

FIG. 3 shows a flow diagram representing the above-described exemplary method. Therein, the network server 12 is specified as a platform server, which may provide a social networking service and which in the illustrated case may also act as a stream server, which may provide streamed data. The various steps are depicted in respective layers of the diagram as follows.

In step 31, the client device of user A provides activity data including a request for streamed content from the platform server, as illustrated by the continued arrow. As a consequence, the requested content is supplied to the client device of user A, as indicated by the dotted arrow. The platform server is configured that, when predetermined streamed data (such as a particular video clip) is requested by user A, the platform server is disposed to undertake one or more of a set of predetermined lines of actions. For example, based on the streamed data requested by A, the platform server may determine that a first predetermined condition is fulfilled. The platform server may be further configured to acquire additional activity data, such as data indicating that user B has logged into the social networking platform (not shown in FIG. 2b), and to determine that the additional activity data complies with second predetermined condition, such as users A and B are registered as friends in the social networking service.

As a consequence, in step 32, the platform server communicates (e.g., by sending instruction data) with the notification server and tells it to send user B a notification inviting user B to rate his or her friend user A with a 'thumbs up' for consuming the particular streamed data (e.g., watching the particular video clip). In step 33, the notification server sends notification data defining a notification including a temporarily receptive user interface (such as the notification 28 with user interface 29 depicted in FIG. 2a) to the client device of user B. The duration of receptivity of the user interface may equal a notification duration assigned to the notification, or may at least be determined based on the notification duration. The latter may be determined based on the current operational context of the notification, by the notification server and/or the platform server and/or a further entity.

In step 34, user B receives the notification through his or her client device and reacts positively to the notification, by operating the user interface within its duration of receptivity and thus producing response data. The client device of user B transmits the response data to the platform server; if user B had decided to not rate user A, the user interface would preferably have become unreceptive after the duration of receptivity (or would have changed its function, e.g., such that the operation thereof would yield a modified result, e.g., the rendering of an error message), which may include that the rendering of the notification and/or the user interface is terminated.

In step 35, the platform server receives the response data provided by user B and communicates with the notification server, telling the notification server to send a (second) notification (such as notification 23 shown in FIG. 2b) to user A, the (second) notification informing user A about the rating of user B for consuming the particular streamed data, and the notification server indeed sends such notification to user A.

Figure 4:
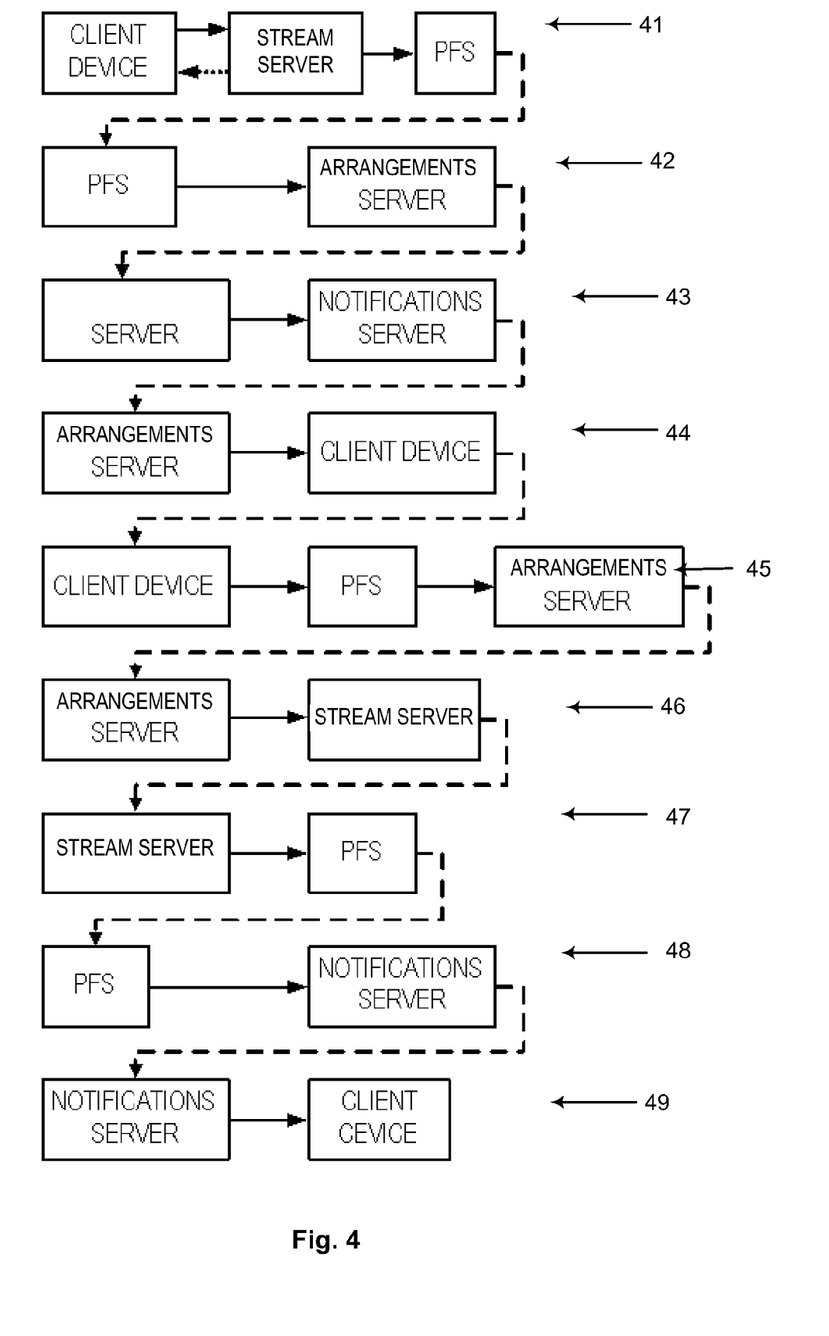
FIG. 4 exemplarily shows a method according to a second embodiment of the present disclosure.

In FIG. 4, an alternative method embodying the present disclosure is shown. As with the method shown in FIG. 3, the method of FIG. 4 may be realized by a system in accordance with the system 10 illustrated in FIG. 1, wherein the network server 12 provides a social networking platform, and thus operates as a platform server PFS.

In step 41, a client device requests streaming content (such as game) from the stream server (which in some embodiments is included in the client device). The stream server is configured to communicate with the platform server PFS when certain conditions are met, such as when a certain level is reached in a game.

In step 42, the platform server PFS recognizes that, in this particular scenario/case, an arrangement such as a deal can/will be offered to the player. It therefore communicates with the arrangements server 15, sending the arrangements server 15 trigger data telling the arrangements server 15 to produce respective arrangement data.

In step 43, the arrangements server 15 indeed produces the arrangement data and sends it to the notifications server 13, along with a request to send respective notification data. In step 44, the notification server 13 sends the notification data with the proposed arrangement embedded therein to the client device which renders the notification, with a user interface included therein, the user interface being receptive to user input only during a duration of receptivity. Therein, the duration of receptivity may be equal to or may functionally depend on a notification duration assigned to the notification, wherein the notification duration is dynamically determined (by the platform server, the notification server, and/or the arrangements server) based on the current operational context.

In step 45, the notification (such as notification 51 illustrated in FIG. 5) offering the arrangement, such as a game asset, and with the temporarily receptive user interface is rendered in a window 50 on the client device. In the exemplary course of action depicted, the user decides to accept the arrangement and provides respective response data by operating the user interface 52 within the duration of its receptivity. The response data is then transmitted to the platform server which in turn communicates with the arrangements server. This pathway facilitates a secure transaction layer and the deal is completed by the player concerned.

In step 46, as the arrangement is complete, the arrangements server communicates with the stream server telling it to modify the streamed data in accordance with the arrangement, such as to make the game asset available to the user. The stream server in turn modifies the streamed data accordingly and then communicates, in step 47, with the platform server telling it that the game asset has been made available to the player.

In step 48, the platform server PFS then communicates with the notification server telling it to send a second notification to the user, the second information informing the user that the transaction is complete and that the streamed data has been modified (which may mean, for example, that the new game asset is now available in the game).

Accordingly, in step 49, the notification server sends such notification to the client device.

Figure 5:
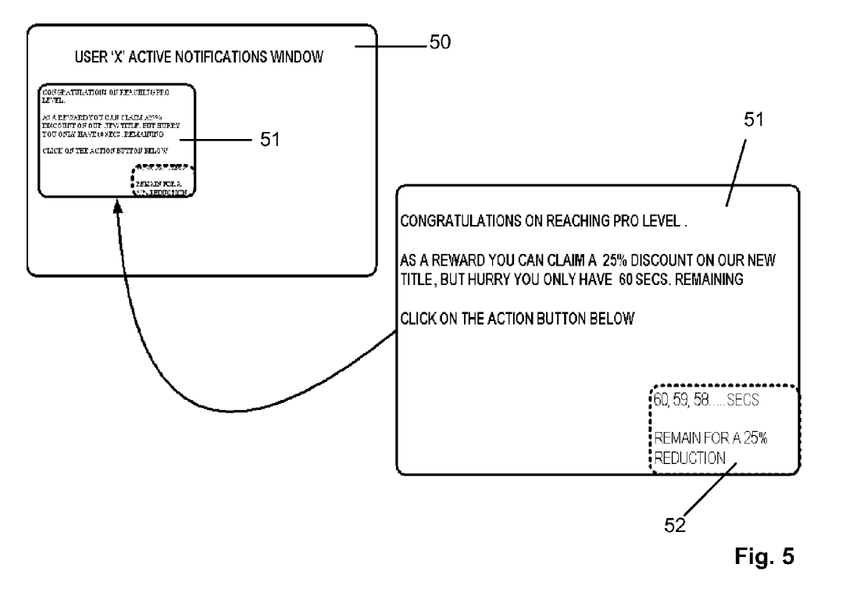
FIG. 5 depicts an exemplary proposed agreement within a notification rendered to a user.

FIG. 5 illustrates an exemplary notification 51 which may be rendered to the user, e.g., in step 45 of the above method. As depicted, the notification is rendered within a notifications window 50, and it includes information about a proposed arrangement as information content. To accept the proposed arrangement, the user may click on user interface 52. As further indicated within the notification 51, the user interface is only temporarily receptive during a duration of receptivity. The remaining time of receptivity is counted down within the user interface 52.

While some embodiments have been described in detail, it is to be understood that the aspects of the present disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The embodiments of the invention in which an exclusive property or privilege is claimed are defined as follows:

1. A method of triggering a notification in a communications network, the method comprising:
    specifying at least one computer device as a recipient device for the notification, wherein the specifying comprises:
        acquiring activity data indicative of at least one user activity in the communications network, wherein the activity data relates to streamed data that a user consumes; and
        determining that the activity data is in accordance with at least one predetermined condition by determining that the activity data is indicative of a predetermined success level achieved by the user with respect to the streamed data; and
    triggering that the notification be rendered on the specified recipient device responsive to determining that the activity data is in accordance with the at least one predetermined condition, wherein a notification duration is assigned to the notification, the notification duration being based on a current operational context of the notification, wherein the notification includes a temporarily receptive user interface, and wherein the user interface is receptive for user input during the notification duration or during a time of receptivity being functionally dependent on the notification duration.

2. The method according to claim 1, wherein said triggering that the notification be rendered on the specified recipient device comprises:
    producing notification data at least partially defining the notification; and
    sending the notification data to the specified recipient device, or sending both the notification data and instruction data via the communications network, the instruction data telling its recipient to send the notification data to the specified recipient device.

3. The method according to claim 1, wherein said triggering that the notification be rendered on the specified recipient device comprises producing provisional notification data partially defining the notification, and sending both the provisional notification data and instruction data via the communications network, the instruction data telling its recipient to produce notification data defining the notification based on the provisional notification data, and to send the notification data to the specified recipient device.

4. The method according to claim 1, wherein said triggering that the notification be rendered on the specified recipient device comprises sending instruction data via the communications network, the instruction data telling its recipient to produce notification data at least partially defining the notification, and to send the notification data to the specified recipient device.

5. The method according to claim 1, further comprising:
    determining the notification duration; or
    sending briefing data via the communications network, the briefing data telling its recipient to determine the notification duration.

6. The method according to claim 1, wherein the activity data comprises data indicative of a first user acting on a first computer device, wherein the first computer device is specified as the recipient for the notification, and data indicative of a second user acting on a computer device different from the specified recipient device.

7. The method according to claim 6, wherein determining that the activity data is in accordance with at least one predetermined condition comprises determining that a predetermined relation has been registered between the first user and the second user.

8. The method according to claim 1, wherein the notification duration is determined based on one or more of:
    a number of devices connected to the communications network;
    a general computing capacity of the specified recipient device; a current performance of the specified recipient device;
    a geographic position of the specified recipient device;
    a general computing capacity of at least one server controlling the communications network;
    a current performance of at least one server controlling the communications network;
    a transmission capacity of the communications network;

a current workload of the communications network;
a time when notification data at least partially defining the notification is produced;
a time when the activity data is captured; and
at least a portion of the activity data.

9. The method according to claim 1, further comprising receiving response data indicative of data which has been input, responsive to the rendering of the notification, into the specified recipient device.

10. A computer system comprising:
a network server for triggering a notification in a communications network, including one or more processors and one or more non-transitory computer-readable media having instructions stored thereon which, when executed by the one or more processors, cause the network server to:
  specify at least one computer device as a recipient device for the notification, wherein the specifying comprises:
    acquiring activity data indicative of at least one user activity in the communications network, wherein the activity data relates to streamed data that a user consumes; and
    determining that the activity data is in accordance with at least one predetermined condition by determining that the activity data is indicative of a predetermined success level achieved by the user with respect to the streamed data; and
  trigger that the notification be rendered on the specified recipient device responsive to determining that the activity data is in accordance with the at least one predetermined condition, wherein a notification duration is assigned to the notification, the notification duration being based on a current operational context of the notification, wherein the notification includes a temporarily receptive user interface, and wherein the user interface is receptive for user input during the notification duration or during a time of receptivity being functionally dependent on the notification duration.

11. The computer system according to claim 10, wherein the specified recipient device is configured:
to receive notification data defining the notification;
to render the notification based on the notification data; and
based on notification duration data included in the notification data or separately received, to stop rendering the notification, or modify a notification content or make the user interface included in the notification unreceptive.

12. The computer system according to claim 11, wherein the specified recipient device is further configured to receive user input data during the notification duration, and based on received user input data, to send response data to the network server.

13. The computer system according to claim 10, wherein the computer system further includes a notification server, the notification server being configured:
to receive or produce notification data at least partially defining the notification;
to receive instruction data telling the notification server to send notification data defining the notification to the specified recipient device; and
to send the notification data to the specified recipient device.

14. The computer system according to claim 10, further comprising a stream server, wherein the stream server is configured:
to provide the streamed data via the communications network, and
to provide the activity data indicative of at least one user activity to the network server.

15. The computer system according to claim 13, further including an arrangements server, wherein the arrangements server is configured:
to receive trigger data telling the arrangements server to produce arrangement data relating to a proposed arrangement with a user of the specified recipient device;
to produce the arrangement data; and
to transmit the arrangement data and the instruction data to the notification server,
wherein the notification server is configured to produce the notification data based on the arrangement data.

16. The computer system according to claim 15, further comprising a stream server, wherein the stream server is configured:
to provide streamed data via the communications network, and
to provide activity data indicative of at least one user activity to the network server;
wherein the network server is further configured:
to receive acceptation data being input responsive to the rendering of the notification on the specified recipient device, wherein the acceptation data indicates that the user of the specified recipient device accepts the proposed arrangement, and
to send, based on the received acceptation data, an acceptation message to the stream server;
wherein the game server is configured to modify, based on the acceptation data, the provided streamed data.

17. One or more non-transitory computer-readable media having stored thereon instructions which, when executed by at least one processor, cause a computer system to:
specify at least one computer device as a recipient device for a notification, wherein the specifying comprises:
  acquiring activity data indicative of at least one user activity in a communications network, wherein the activity data relates to streamed data that a user consumes; and
  determining that the activity data is in accordance with at least one predetermined condition by determining that the activity data is indicative of a predetermined success level achieved by the user with respect to the streamed data; and
trigger that the notification be rendered on the specified recipient device responsive to determining that the activity data is in accordance with the at least one predetermined condition, wherein a notification duration is assigned to the notification, the notification duration being based on a current operational context of the notification, wherein the notification includes a temporarily receptive user interface, and wherein the user interface is receptive for user input during the notification duration or during a time of receptivity being functionally dependent on the notification duration.

18. The non-transitory computer-readable media according to claim 17, wherein said instructions further comprise instructions which, when executed by the at least one processor, cause the computer system to:

produce provisional notification data partially defining the notification, and send both the provisional notification data and instruction data via the communications network, the instruction data telling its recipient to produce notification data defining the notification based on the provisional notification data, and to send the notification data to the specified recipient device.

19. The non-transitory computer-readable media according to claim 17, wherein said instructions further comprise instructions which, when executed by the at least one processor, cause the computer system to:

send instruction data via the communications network, the instruction data telling its recipient to produce notification data at least partially defining the notification, and to send the notification data to the specified recipient device.

20. The non-transitory computer-readable media according to claim 17, wherein the activity data comprises data indicative of a first user acting on a first computer device, wherein the first computer device is specified as the recipient for the notification, and data indicative of a second user acting on a computer device different from the specified recipient device.

* * * * *